United States Patent
Zhou et al.

(10) Patent No.: US 9,588,362 B2
(45) Date of Patent: Mar. 7, 2017

(54) METHOD FOR ASSEMBLING LIQUID CRYSTAL DISPLAY

(71) Applicant: Shenzhen China Star Optoelectronics Technology Co., Ltd., Shenzhen, Guangdong (CN)

(72) Inventors: Gege Zhou, Guangdong (CN); Qing Guo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 134 days.

(21) Appl. No.: 14/431,686

(22) PCT Filed: Jan. 8, 2015

(86) PCT No.: PCT/CN2015/070376
§ 371 (c)(1),
(2) Date: Mar. 26, 2015

(87) PCT Pub. No.: WO2016/106807
PCT Pub. Date: Jul. 7, 2016

(65) Prior Publication Data
US 2016/0341985 A1    Nov. 24, 2016

(30) Foreign Application Priority Data
Dec. 29, 2014   (CN) .......................... 2014 1 0842917

(51) Int. Cl.
G02F 1/13      (2006.01)
G02F 1/1333    (2006.01)

(52) U.S. Cl.
CPC ...... *G02F 1/1309* (2013.01); *G02F 1/133308* (2013.01); *G02F 2001/133354* (2013.01); *G02F 2202/28* (2013.01)

(58) Field of Classification Search
CPC ....................... G02F 1/1309; G02F 1/133308
See application file for complete search history.

(56) References Cited

U.S. PATENT DOCUMENTS

2014/0124121 A1*  5/2014  Wang ..................... G06F 3/041
                                                              156/64

* cited by examiner

*Primary Examiner* — Anne Hines
(74) *Attorney, Agent, or Firm* — Andrew C. Cheng

(57) ABSTRACT

A method for assembling a liquid crystal display includes fixing a liquid crystal panel and a touch panel together to form a touch display screen; inspecting the touch display screen; if no defect is identified in inspecting the touch display screen, fixing the touch display screen and a backlight unit together to form a touch display backlight module screen; and inspecting the touch display backlight module screen. The method for assembling the liquid crystal display helps reduce waste of backlight units and increases yield rate.

5 Claims, 1 Drawing Sheet

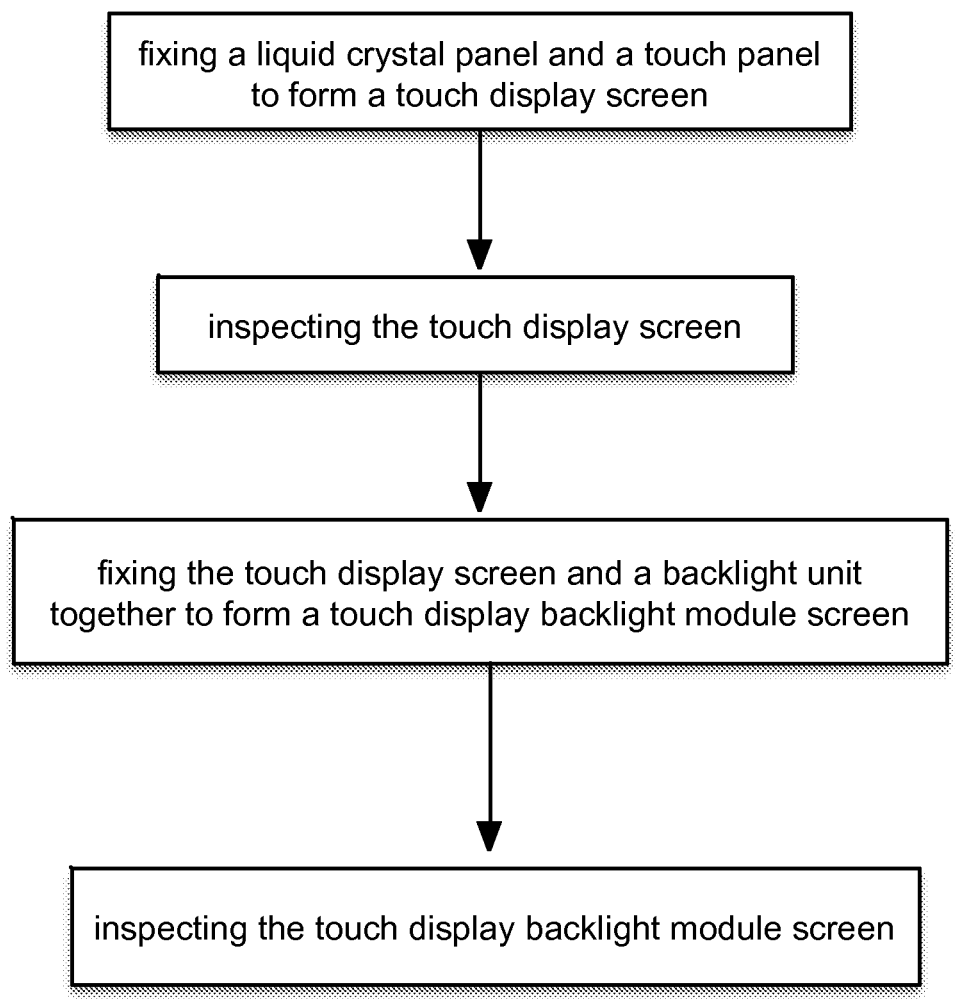

METHOD FOR ASSEMBLING LIQUID CRYSTAL DISPLAY

CROSS REFERENCE TO RELATED APPLICATIONS

This application claims the priority of Chinese Patent Application No. 201410842917.6, entitled "Method for Assembling Liquid Crystal Display", filed on Dec. 29, 2014, the disclosure of which is incorporated herein by reference in its entirety.

BACKGROUND OF THE INVENTION

1. Field of the Invention

The present invention relates to a method for assembling a liquid crystal display.

2. The Related Arts

Heretofore, touch liquid crystal displays have been widely used in various electronic products as displaying components of the electronic products. Such electronic devices have bezels that are getting increasingly slimmed and also have been demanded for increasingly heightened brightness, while suiting the needs of saving power.

Generally, a backlight module included touch display screen comprises a light guide plate, a mold frame arranged around a circumference of the light guide plate, a light source flexible circuit board, and a light shield adhesive tape. The light source flexible circuit board is attached to the light guide plate and the mold frame by the light shield adhesive tape. An optic film is also fixed to the mold frame by means of light shield double-sided adhesive tapes. A liquid crystal display screen is fixed to the circumference of a backlight unit by double-sided adhesive tape. A touch panel is fixed to the liquid crystal display screen.

The manufacturing operations that are currently adopted first fixing the liquid crystal display screen and the backlight unit together to form a liquid crystal backlight module and then fixing the touch panel and the liquid crystal backlight module together to form a touch liquid crystal backlight module. However, when it comes to the attention that the touch panel, after being fixed, has defects (such as defects involving air bubbles and foreign objects) and must be reworked, it is necessary to have the touch panel and the liquid crystal backlight module disassembled, which must be carried out in a solvent in an extremely low temperature environment. Such a process itself causes damage to the backlight unit and a great waste may result.

SUMMARY OF THE INVENTION

The technical solution to be addressed in the present invention is to provide a method for assembling a liquid crystal display, which reduces the waste of backlight units and increases the yield rate.

To achieve the above object, embodiments of the present invention provide the following technical solutions:

The present invention provides a method for assembling a liquid crystal display, which comprises: fixing a liquid crystal panel and a touch panel together to form a touch display screen; inspecting the touch display screen; if no defect is identified in inspecting the touch display screen, fixing the touch display screen and a backlight unit together to form a touch display backlight module screen; and inspecting the touch display backlight module screen.

In the above method, in inspecting the touch display screen, the touch display screen is positioned on an inspection fixture with a general-purpose backlight unit being arranged on the inspection fixture and the touch display screen being positioned above the general-purpose backlight unit.

In the above method, if defects are identified in inspecting the touch display backlight module screen, the backlight unit is removed from the touch display screen and the backlight unit is reworked.

In the above method, the backlight unit and the touch display screen are fixed to each other by a double-sided adhesive tape.

In the above method, the liquid crystal panel and the touch panel are fixed to each other by optic adhesive.

In the above method, inspecting the touch display screen is carried out to identify defects of air bubbles or foreign objects between the liquid crystal panel and the touch panel or bright lines.

The present invention is carried out by first fixing a liquid crystal panel and a touch panel together to form a touch display screen and then inspecting the touch display screen to ensure the touch display screen is free of defects and then having the backlight unit assembled so that if after the assembling of the backlight unit, defects are identified in inspection, it only needs to remove and rework the backlight unit, wherein removing the backlight unit is a simple and easy to perform process because the backlight unit and the touch display screen are fixed to each other only by double-sided adhesive tapes. This helps increase production efficiency, improves yield rate, and lowers down cost.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

FIG. 1 is a schematic view illustrating a method for assembling a liquid crystal display according to an embodiment of the present invention.

DETAILED DESCRIPTION OF THE PREFERRED EMBODIMENTS

A clear and complete description will be given to a technical solution proposed in an embodiment of the present invention with reference to the attached drawings of the embodiment of the present invention.

The present invention provides a method for assembling a liquid crystal display. Referring to FIG. 1, the method for assembling the liquid crystal display comprises the following steps:

The liquid crystal panel and the touch panel are fixed together to form a touch display screen. Specifically, the liquid crystal panel and the touch panel are fixed to each other by applying optic adhesive therebetween. The liquid crystal panel comprises, sequentially stacked, a top polarizer, glass, and a bottom polarizer. The touch panel is adhesively fixed to a top of the top polarizer by the optic adhesive.

The touch display screen is inspected. In inspecting the touch display screen, the touch display screen is positioned on an inspection fixture with a general-purpose backlight unit arranged on the inspection fixture. The touch display screen is positioned above the general-purpose backlight unit. The general-purpose backlight unit has a size that is relatively large so as to be applicable to touch display screens of different sizes. The function of the general-purpose backlight unit in the inspection fixture is to provide a light source to the touch display screen so that the touch display screen can be inspected, under an illuminated condition, for any defect existing therein. In the process of inspecting the touch display screen, defects such as air bubbles or foreign objects between the liquid crystal panel and the touch panel or bright lines, are identified.

If the inspection identifies the existence of defects in the touch display screen, the touch panel needs to be disassembled from the liquid crystal panel. This process must be carried out in an extremely low temperature environment and in a solvent to carry out the disassembling. Since the touch display screen is not yet assembled with a backlight unit so that even in this reworking operation, no backlight unit will be damaged. Thus, the production efficiency can be increased and the cost is also saved.

If the inspection confirms the touch display screen is free of defects, then the touch display screen and a backlight unit are fixed together to form a touch display backlight module screen. The backlight unit and the touch display screen are fixed together by double-sized adhesive tapes.

The touch display backlight module screen is then inspected. During the inspection process of the touch display backlight module screen, if defects are found, the backlight unit is removed from the touch display screen and the backlight unit is reworked. Since the backlight unit and the liquid crystal display panel are fixed to each other by double-sided adhesive tapes, reworking the backlight unit can be carried out in a simple process without a specific environment and solvent.

The present invention is carried out by first fixing a liquid crystal panel and a touch panel together to form a touch display screen and then inspecting the touch display screen to ensure the touch display screen is free of defects and then having the backlight unit assembled so that if after the assembling of the backlight unit, defects are identified in inspection, it only needs to remove and rework the backlight unit, wherein removing the backlight unit is a simple and easy to perform process because the backlight unit and the touch display screen are fixed to each other only by double-sided adhesive tapes. This helps increase production efficiency, improves yield rate, and lowers down cost.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A method for assembling a liquid crystal display, comprising:
    fixing a liquid crystal panel and a touch panel together to form a touch display screen;
    inspecting the touch display screen;
    if no defect is identified in inspecting the touch display screen, fixing the touch display screen and a backlight unit together to form a touch display backlight module screen; and
    inspecting the touch display backlight module screen;
    wherein if defects are identified in inspecting the touch display backlight module screen, the backlight unit is removed from the touch display screen and the backlight unit is reworked.

2. The method for assembling the liquid crystal display as claimed in claim 1, wherein in inspecting the touch display screen, the touch display screen is positioned on an inspection fixture with a general-purpose backlight unit being arranged on the inspection fixture and the touch display screen being positioned above the general-purpose backlight unit.

3. The method for assembling the liquid crystal display as claimed in claim 1, wherein the backlight unit and the touch display screen are fixed to each other by a double-sided adhesive tape.

4. The method for assembling the liquid crystal display as claimed in claim 1, wherein the liquid crystal panel and the touch panel are fixed to each other by optic adhesive.

5. The method for assembling the liquid crystal display as claimed in claim 1, wherein inspecting the touch display screen is carried out to identify defects of air bubbles or foreign objects between the liquid crystal panel and the touch panel or bright lines.

\* \* \* \* \*